March 22, 1960     L. E. SPROUSE     2,929,464
FLAT KNIT FILTER MEDIA
Filed May 18, 1959
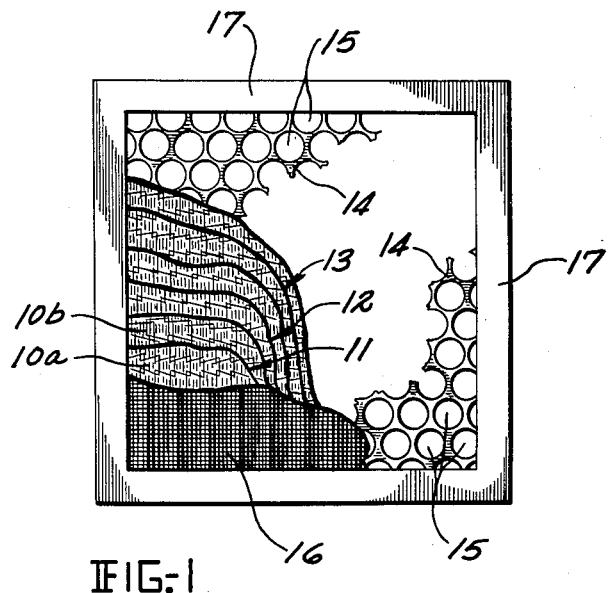
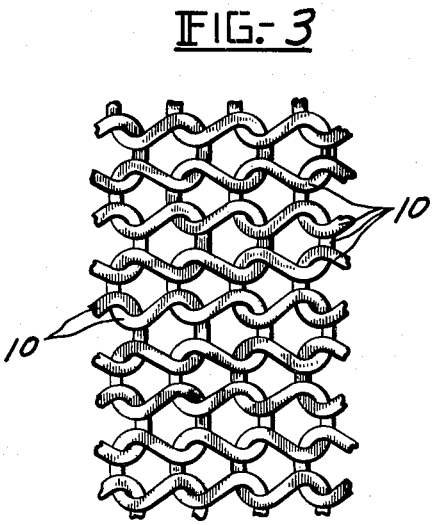
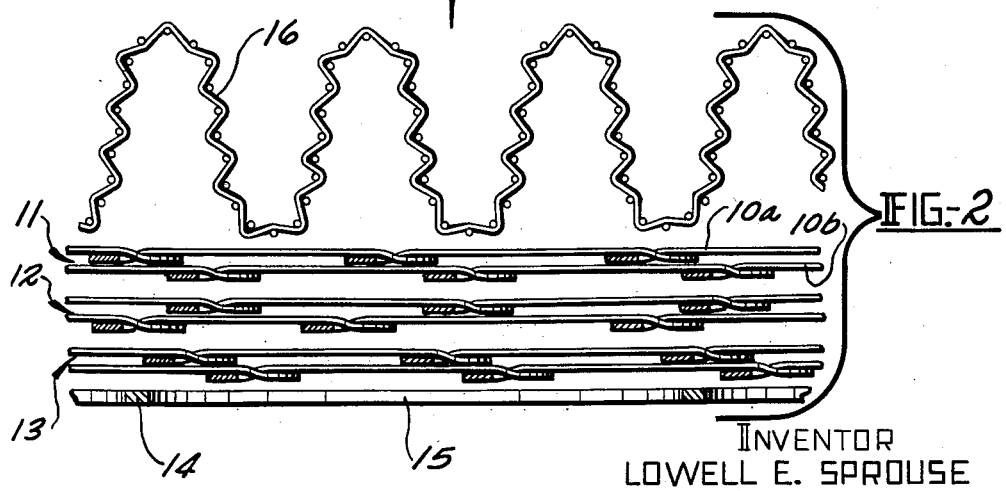
INVENTOR
LOWELL E. SPROUSE
BY Herbert A. Minturn
ATTORNEY

United States Patent Office 2,929,464
Patented Mar. 22, 1960

2,929,464

FLAT KNIT FILTER MEDIA

Lowell E. Sprouse, Columbus, Ind., assignor to Vernco Corporation, Columbus, Ind.

Application May 18, 1959, Serial No. 813,859

1 Claim. (Cl. 183—69)

This invention relates to an air, gas, or liquid filter embodying a plurality of overlying thin and narrow metal strips knitted originally in a cylindrical tube-like manner, the cylindrical form being flattened to provide one knitted area in contact with an opposite knitted area, the combined two areas being rolled out into a flattened state.

A primary purpose of this invention is to provide a filtering structure whereby a higher degree of efficiency is obtained, that is, the removal of a greater amount of dust and foreign solids from the air or gas flowing through the filter as compared to a filtering media wherein there may be a plurality of these knitted sheets of copper ribbons, but in which the ribbons present faces generally parallel to the direction of flow of the air or gas therethrough. According to tests, the filtering media employing the flattened knitted material shows 19 percent better arrestment of dust over and above that arrested by the knitted ribbon material of the same size and same knitting or a 6.94 percent of increase in efficiency. Some tests show even better results in comparison. There is a slight increase in resistance to flow of the gas or air through the media in the rolled condition, as compared to the unrolled, yet this increase in resistance is so slight as to permit the flow to be well within the allowable limits recommended by the Air Filter Institute Code.

This and other objects and advantages of the invention will become apparent to those versed in the art in the following description of one particular form of the filter as illustrated in the accompanying drawing, in which Fig. 1 is a view in fragmentary form of a filter embodying the invention;

Fig. 2 is a view in section in expanded relation of the various elements of the filter as to one limited length of section therethrough; and Fig. 3 is a detail in top plan of a portion of the flattened, knitted medium.

Referring to Fig. 3, a plurality of flattened strips or copper ribbons 10 of about 36 gauge and up to one thirty-second of an inch in width are initially knitted into a cylindrical or stocking form as above indicated. This knitted structure is then flattened by any suitable process such as by rolling into the companion layers 10a and 10b, Fig. 2 wherein one layer is in contact with the other, and the strips are flattened into parallelism transversely of the direction of flow of air to be had through the filter as indicated by the arrow in Fig. 2. Normally the strips or ribbons would be disposed less than ninety degrees to that direction, and in fact in most instances approximately parallel thereto.

In the present form of the filter construction, three of these pairs designated generally by the numerals 11, 12 and 13 are employed. These three pairs are laid over a backing, herein shown as a foraminous sheet of metal 14, in fact being a scrap sheet having closely spaced holes 15 therethrough resulting from punching out circular disks for other uses such as in making bottle crowns. In any event, the sheet 14 provides little resistance to the flow of gas or air therethrough and yet is sufficiently rigid to maintain the three pairs of layers 11, 12 and 13 without bagging.

Over these members 11, 12, 13 and 14 is laid a corrugated or rather ribbed expanse of a woven wire screen having from one-sixteenth to one-eighth inch mesh, being comparable to the odinary galvanized iron window frame screen wire. This wire screen material is designated generally by the numeral 16. All of these layers of material 11, 12, 13, 14, and 16 are retained by their marginal portions within a suitable frame 17, the details of which do not enter into the present invention and hence are not illustrated. Normally the various layers illustrated in Fig. 2 will be in contact one with the other rather than separated, the separation being made for the sake of clarity in the illustration of the relation of the various parts one with the other.

A reason for the great increase in efficiency and arresting of dirt and dust in the flow of gas or air through the filter would seem to reside in the fact that the copper ribbons 10 are flattened so as to be at right angles to the flow of the air and hence present a greater area of contact with the air so that there is a greater area on which the dust or dirt may be collected. This filter is employed in a dry state, that is, there is no oil or adhesive applied thereto in making the tests above indicated. It is however entirely possible for a dust adhesive coating of the various layers to be had although as indicated a high efficiency is secured without such a coating.

In order to illustrate the proportioning of the filtering medium layers, the following dimensions are given, not in limitation, but as illustrative of one particular form and size which operates successfully. The individual ribbon 10 is made of copper, 36 gauge, or .0067 inch thick and is approximately one thirty-second of an inch wide. The strips are loosely knitted to provide a mesh ranging from one-eighth to five thirty-seconds of an inch in openings. The screen 16 may be of galvanized iron.

Therefore while I have shown my invention in the one particular form, particularly in respect to the number of layers of the knitted fabric employed, and the use of the wire screen 16, I do not desire to be limited to that precise form beyond the limitations which may be imposed by the following claim in view of the fact that variations may be made without departing from the spirit of the invention.

I claim:

A filtering medium of a composite nature for gaseous flows having entering and egress sides, comprising a generally flat, foraminous backing sheet on the egress side; a plurality of superimposed layers of knitted flat ribbon-like wires in contact one layer with the other and disposed across said backing sheet; and a corrugated layer of open mesh woven wire on said entering side and disposed over and in contact with said superimposed layers; the corrugations of said woven wire defining ridges separated by grooves wherein the gas entering the filter flows laterally initially through the sides of the ridges of said corrugations into grooves within those ridges and therein changes directions of flow to pass through said superimposed layers.

References Cited in the file of this patent

UNITED STATES PATENTS

| 1,676,191 | Jordahl | July 3, 1928 |
|---|---|---|
| 2,082,513 | Roberts | June 1, 1937 |
| 2,274,684 | Goodloe | Mar. 3, 1942 |
| 2,334,263 | Hartwell | Nov. 16, 1943 |
| 2,382,560 | Goodloe | Aug. 14, 1945 |